Figure 1:
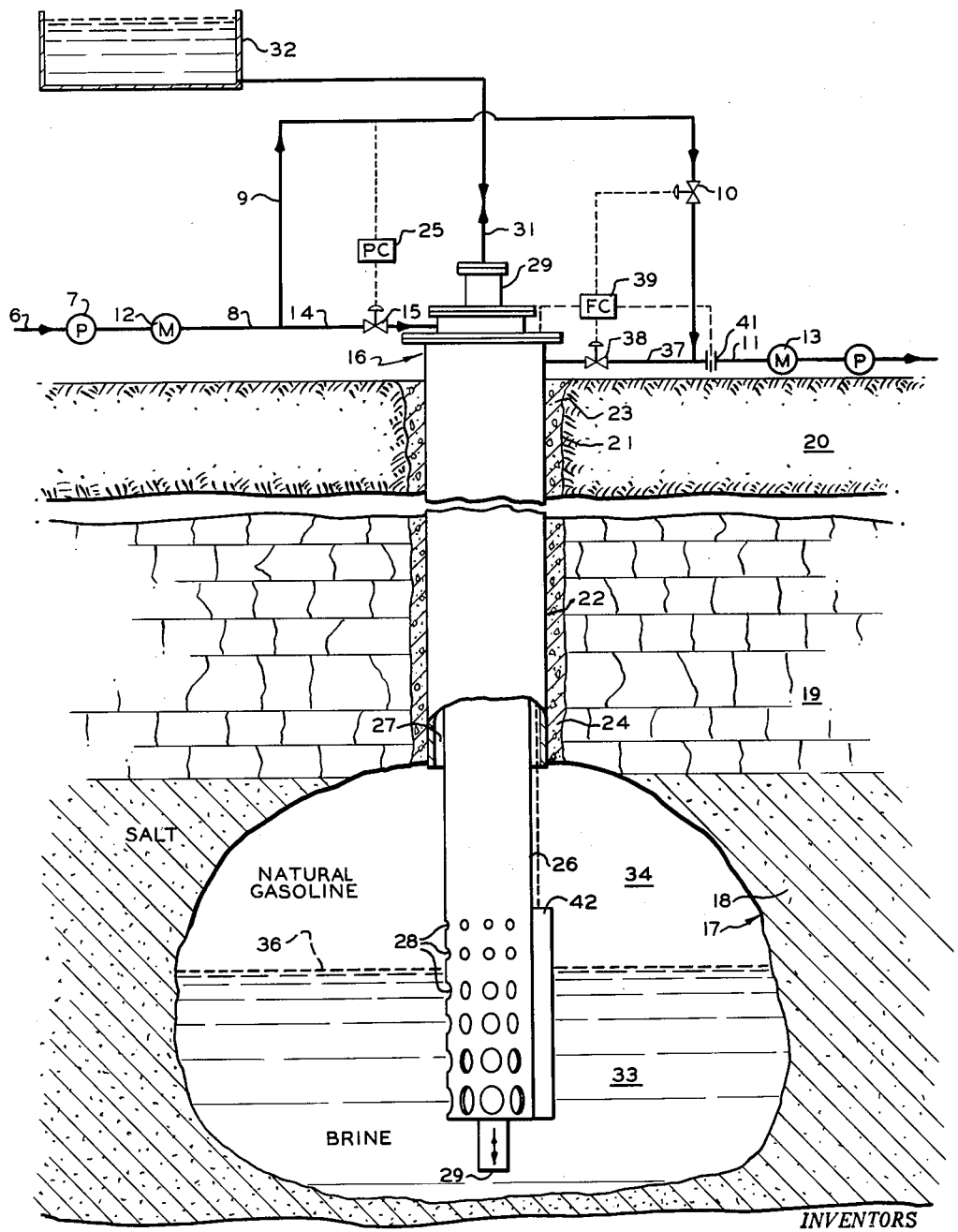

April 3, 1962  K. C. BOTTENBERG ETAL  3,027,901
SURGE SYSTEM
Filed Aug. 14, 1959  2 Sheets-Sheet 1

INVENTORS
K.C. BOTTENBERG
H.V. HENDRIX
BY Hudson E. Young
ATTORNEYS

United States Patent Office 3,027,901
Patented Apr. 3, 1962

3,027,901
SURGE SYSTEM
Kenneth C. Bottenberg and Hurshel V. Hendrix, Bartlesville, Okla., assignors to Phillips Petroleum Company, a corporation of Delaware
Filed Aug. 14, 1959, Ser. No. 833,864
10 Claims. (Cl. 137—8)

This invention relates to a surge system. In another aspect, it relates to a method and apparatus for supplying a normally liquid, volatile hydrocarbon feed to fractionators, or the like, at a constant rate from a source thereof having a normally variable rate of flow. In another aspect, it relates to a method and apparatus wherein subsurface, or underground, surge facilities are used for supplying a normally liquid, volatile hydrocarbon feed, such as natural gasoline, to fractionators, or the like, at a constant rate from a source thereof having a normally variable rate of flow, such as a common header to which are connected the supply lines from a number of gasoline plants having fluctuating outputs and variable capacities.

In various industrial processes or operations it is often necessary to have at all times an ample and constant supply of one or more materials or feeds. For example, in the refining of natural gasoline it is necessary that the supply of this product or feed to fractionating towers be relatively constant since such towers are designed and constructed for a specific feed rate or range of feed rates. Where the available supply of such product is not constant or where it fluctuates, it is necessary to employ some type of surge system in order to supply the product as feed having the requisite constant flow rate demanded by the process or operation. For example, in the refining of natural gasoline the outputs of several plants are conveyed in a common stream to a surface surge tank of limited capacity, from which the product is supplied to fractionators at a constant rate of flow. Due to the different capacities and periods of operation of the several plants, the common stream of natural gasoline will normally have a fluctuating or variable flow rate different from that of the desired flow rate of the feed sent to the fractionators for further processing.

Where the amount of supply or product conveyed to the surface surge system is variable and relatively large, the capacity of the surge system must of necessity be correspondingly large enough to accommodate the product. Generally, this means that expensive steel tanks of massive construction and capacity may be required. Such surge tanks must be designed to withstand the vapor pressure of the product. Moreover, where the product contains any substantial amount of solid, suspended impurities or foreign substances, such as iron sulfide, it is desirable that such tanks have sufficient volume to enable the settling of the suspended impurities. If the product to be handled is normally a volatile liquid, such as natural gasoline or other hydrocarbons, the filling and emptying of the surge tanks will also result in severe "breathing" losses due to changes in temperature during the heat of the day and the cool of the night. While these losses can be reduced by providing the storage tanks with breather roofs or the like, such equipment is relatively costly and does not eliminate all of the losses of valuable product, or completely insure the safe handling of the volatile hydrocarbon.

The problem of adequate storage in surge facilities is also aggravated where the product handled is one which experiences seasonal peak demand and corresponding seasonal slack periods, such as that common to the natural gasoline and liquefied petroleum gas industries. These fluctuations in demand also require large storage facilities. The use of large, high pressure, sealed tanks for this purpose necessarily entails greater expense in the handling and storage of the product. In many cases the large bulk storage of product is not economically feasible.

Figure 2:
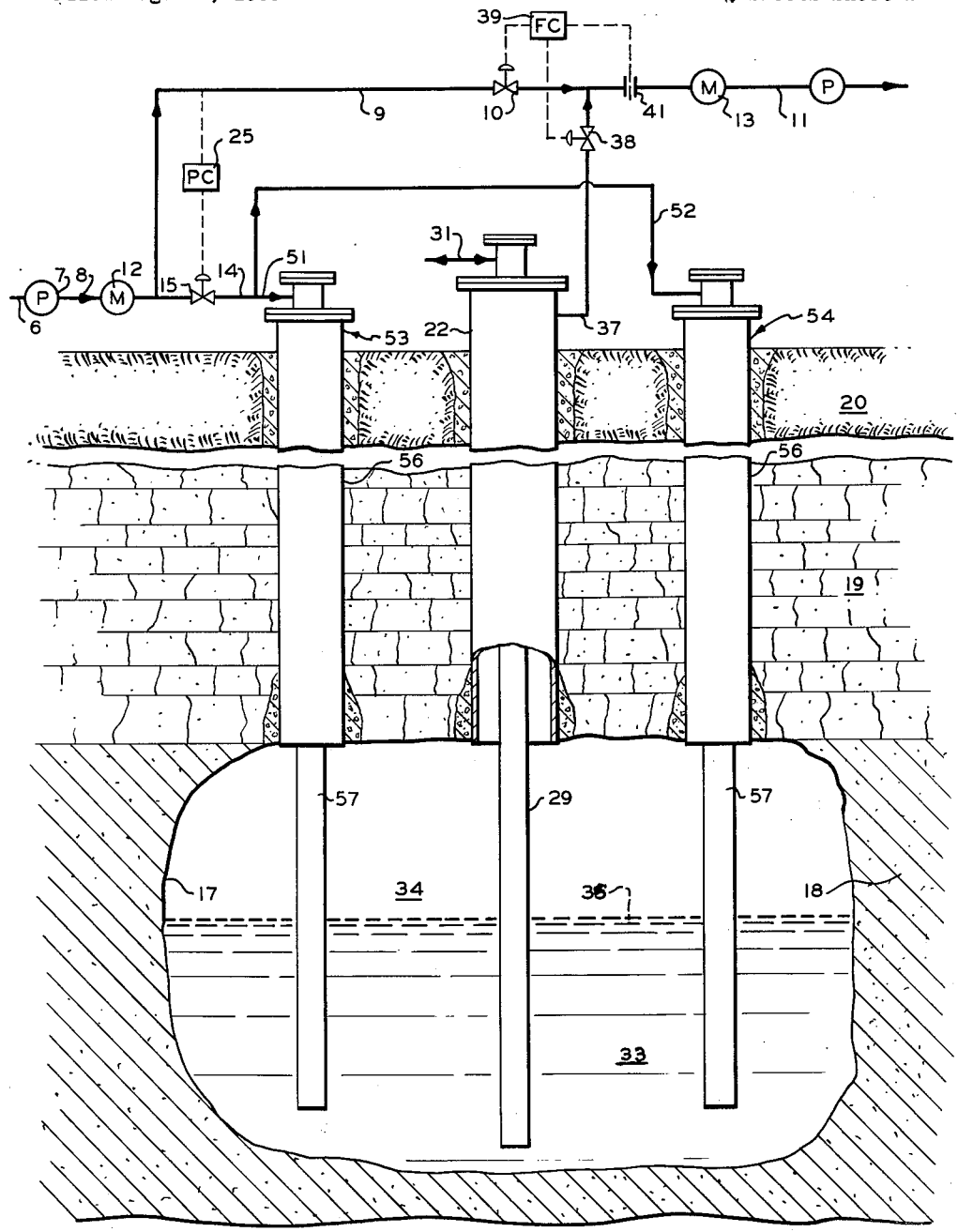

Accordingly, an object of this invention, is to provide an improved surge system. Another object is to provide an improved method and apparatus for supplying a normally liquid, volatile hydrocarbon feed to fractionators, or the like, at a constant rate from a source thereof having a normally variable rate of flow. Another object is to provide a method and apparatus wherein subsurface, or underground, surge and storage facilities are used for supplying a normally liquid, volatile hydrocarbon feed, such as natural gasoline, to fractionators or the like, at a constant rate of flow from a variable source thereof, such as a common header to which are connected the supply lines from a number of plants having fluctuating outputs and variable capacities. Another object is to provide a surge system of large capacity which is relatively unaffected by changes in ambient temperature. Another object is to provide a surge system having sufficiently large capacity to enable the effective settling of solid impurities and permit the product handled to become uniform in composition. Another object is to minimize the breathing losses during the handling of relatively high volatile, normally liquid hydrocarbons. A further object is to provide a safe, reliable, and relatively economical improved surge system for handling normally liquid, volatile hydrocarbons, such as natural gasoline. Further objects and advantages of this invention will become apparent to those skilled in the art from the following discussion, appended claims, and accompanying drawing in which:

FIGURE 1 is a diagrammatic view in elevation and partial section of one embodiment of the surge system of this invention; and FIGURE 2 is a view similar to FIGURE 1 illustrating another embodiment of this invention.

The "normally liquid, volatile hydrocarbons" used in this invention includes any of those which are normally liquid under the conditions of operation of this invention, such as natural gasoline, straight run or cracked gasoline, kerosene, liquefied petroleum gas, crude oil, and the like.

Reference will now be made to the accompanying drawing wherein like parts have been designated with like reference numbers. For purposes of illustration and description, the subject invention will be hereinafter set forth by showing its utility in the handling of natural gasoline, although it is to be understood that it is not to be limited thereto since it is applicable wherever it is desired to handle any high volatile, normally hydrocarbon or the like.

Referring to FIGURE 1, one or more streams of natural gasoline are conveyed to a common point or header, line 6, and pumped by pump 7 into line 8. The flow rate in header 6 normally fluctuates or varies, e.g., from hour to hour, night and day, week to week, season to season, etc. Further the compositions of the various streams which are conveyed by the common header 6 may differ, e.g., sometimes the natural gasoline may be almost pure propane. The supply of natural gasoline in line 8 is conveyed by line 9, having a flow control valve 10 therein, to a feed supply line 11, the natural gasoline feed in this line being conveyed to fractionators or the like for further processing. Lines 8 and 11 are preferably provided with flow meters 12 and 13, respectively. Natural gasoline will also be conveyed from line 8, under certain conditions of operation hereinafter described, to line 14, having a flow control valve 15 therein located at a point downstream of line 9, to an underground storage cavern generally designated 16. Valve 15 is operatively connected to a pressure controller 25 which in turn is operatively connected to line 9 for measuring the pressure therein.

Underground cavern 16 is formed in a generally impermeable formation, either by conventional mining methods or, preferably, by dissolving out a soluble material with solvents to create a storage space in the soluble formation, for example a salt dome. Since the cavern is located below ground, the contents thereof are not subjected to the fluctuating ambient temperatures normally encountered above ground, the temperature underground being relatively constant. Such storage space is far more economical than would be surface storage tanks above ground having comparable capacities.

The underground cavern 16 comprises a cavity 17 formed within a soluble formation 18, such as salt, with overlying unsoluble formations 19, 20, thereabove. The underground cavern 16 is provided with an access bore 21 which communicates with the cavity 17. Depending within access bore 21 is a casing 22 which is cemented in place with cement 23 to provide the cavern with a fluid-type seal. This cement can extend the entire length of the casing 22, or it may be provided just at the top thereof with a cemented foot 24 at the bottom near the roof of the cavity 17. Depending within casing 22 is a string of tubing 26, an annulus 27 being formed therebetween, the low end of tubing 26 depending beneath the lower end of casing 22. The lower end of tubing 26 is provided with a plurality of spaced openings 28 whose diameters progressively increase toward the lower end of tubing 26. If desired, another string of tubing 29 can be inserted within tubing 26, the lower end of the inner tubing 29 depending below the lower end of the outer tubing 26 and being adjacent the bottom of the cavity 17. The upper end of the inner tubing 29 is connected to a line 31 which is in turn in communication with an above ground tank 32. A pool of displacing liquid 33 such as brine, occupies the lower portion of the cavity 17 with the immiscible, lighter stored product 34, natural gasoline, thereabove occupying the upper portion of the cavity, an interface 36 being formed between the brine 33 and product 34. The lower ends of both tubing 26 and 29 depend below interface 36 and communicate with displacing liquid 33. The upper end of annulus 27 is connected to a product withdrawal line 37 having a flow control valve 38 therein, this latter line communicating with the feed supply line 11 at a point downstream of valve 38. Line 31 is adapted to convey displacing liquid from pool 33 to tank 32 when product is introduced into cavern 16 via tubing 26, and vice versa.

The rate of flow of natural gasoline in line 11 is constantly monitored by flow controller 39, which is connected to an orifice 41 in line 11. This flow controller 39 is operatively connected to valve 10 in line 9 and valve 38 in line 37. This flow controller 39 can also be operatively connected to a liquid level measuring device 42 connected to the lower end of the tubing 26, this liquid level controller being operatively adapted to measure the liquid level 36 and reset the flow controller 39 so as to maintain the liquid level 36 within a desired range.

In the operation of the surge system set forth in FIGURE 1, natural gasoline is conveyed in line 6 at a normally variable flow rate, e.g., 80,000±20,000 barrels/day. When this flow rate is within that range desired to be passed to the fractionators, the natural gasoline is pumped via 8 and 9 into the feed supply line 11. Flow controller 39 constantly monitors the flow rate of line 11 and if the flow rate in line 11 is below or above a predetermined flow rate, the following operations are undertaken.

If the flow rate within line 11 is above a predetermined flow rate, e.g., above 80,000 barrels/day, flow controller 39 accordingly restricts the flow in line 9 by gradually closing down valve 10 until the flow rate in line 11 is within the desired flow rate. The pressure within line 9 is constantly monitored by pressure controller 25 and if with the decrease of flow in line 9 the pressure therein rises above a predetermined value, e.g., above 600 p.s.i.g., the pressure controller will accordingly open valve 15 in line 14 somewhat so as also to permit natural gasoline to be supplied from line 8 to the surge cavern 16, the latter having a cavity of sufficient capacity, e.g., 250,000 barrels and 600 ft. in height. Natural gasoline flows down tubing 26 and via openings 28 into the cavity 17. The higher the rate of flow of natural gasoline thus introduced into the cavern 16, the larger the amount which passes through the lower larger diameter holes or opening 28, thus enabling a larger proportion of the natural gasoline to flow into the body of brine 33, and thereby result in a greater degree of uniformity in the composition of the natural gasoline. The natural gasoline passing through the openings 28 bubbles through the brine 33 and mingles with the product 34 in the upper portion of the cavity 17, the natural gasoline being lighter than and immiscible with the brine. During the introduction of the natural gasoline into the cavern 16, the brine 33 is displaced therefrom via the inner tubing 29. The displaced brine enters the lower end of the tubing 29 and flows upwardly therethrough into line 31 and then into the brine tank 32. It is evident that pressure of the product 34 within the cavity must permit this displacement.

If the flow rate within line 11 falls below the predetermined flow rate, the flow controller 39 can accordingly further open valve 10. If valve 10 is fully opened and the flow rate within line 11 is still below that of a predetermined value, the flow controller 39 can cause valve 38 to be opened to the extent and period necessary to bring and maintain the flow rate of line 11 within the desired range. When the pressure in line 9 decreases to a predetermined value pressure controller 25 will actuate valve 15 to cause it to close.

In the operation of the storage cavern 16, it is desired to prevent either the complete filling or the complete emptying of product 34 in the cavity 17. For example, assuming the total depth or bottom of the cavity 17 is at 1500 feet, it may be desirable to keep the liquid level 36 between 1100 and 1300 feet. The liquid level controller 42 constantly monitors the height of this liquid level 36. If this liquid level drops to below 1300 feet, the flow controller 39 can be automatically reset so as to change the desired flow rate in line 11, for example, increasing this flow rate to 84,000 barrels/day by further opening valve 10. Alternatively, if the liquid level 36 rises to a height above 1100 feet, the liquid level controller 42 can accordingly reset the flow controller 39 so as to decrease the flow rate within line 11, for example to 76,000 barrels/day, by further closing valve 10.

Alternatively, the location of the interface 36 can be located by use of flow meters 12 and 13, by which an accurate record can be kept of the amounts of natural gasoline introduced into the cavern 16 and withdrawn therefrom. With previously obtained knowledge of the cavern size and shape (determined by various conventional means), and the recorded flow rates, the interface 36 can be located, and this information used in preventing the complete filling or emptying of product in the cavern.

Because of the large, economical storage space provided by the underground cavern, the stored product therein will have sufficient residence time to enable the composition thereof to become uniform. Further, this large storage space permits foreign materials, such as iron sulfide, normally suspended in the introduced product, to drop out and settle in the bottom of the cavern.

Referring now to the embodiment shown in FIGURE 2, wherein parts like those of FIGURE 1 have been designated with like reference numbers, an alternative way is illustrated for making the composition of the natural gasoline more uniform. In FIGURE 2, the natural gasoline occupying the upper portion 34 of the cavity 17 is introduced from line 14 by conveying it through a plurality of lines 51, 52, which are connected to a plurality of inlet wells 53, 54, respectively, communicating with the cavity 17 adjacent the periphery thereof. Each of the inlet wells 53, 54 can comprise a cemented casing 56 in which depends an inner tubing 57, the upper end of each of the tubings 57 being connected to one of the natural gasoline supply lines 51, 52. By introducing the natural gasoline into a plurality of these inlet wells, the natural gasoline is caused to flow through a greater portion of the brine 33, causing a more intimate contact therewith. This method of introducing natural gasoline permits composition of the product within the cavern to become more uniform. In other respects, the operation of the embodiment shown in FIGURE 2 is like that of FIGURE 1.

Various modifications and alterations of this invention will become apparent to those skilled in the art from the foregoing discussion and accompanying drawing, and it should be understood that the subject invention is not to be unduly limited thereto.

We claim:

1. A process for supplying a liquid at a constant flow rate from a source thereof having a normally variable flow rate, which comprises passing said liquid from said source via a first line to a feed supply line, continuously measuring the pressure in said first line, continuously measuring the flow rate in said feed supply line, automatically increasing the flow rate in said first line when the flow rate in said feed supply line falls to a predetermined value so as to maintain the flow rate in said feed supply line within a desired flow rate range, automatically decreasing the flow rate in said first line when the flow rate in said feed supply line rises to a predetermined flow rate, the increasing and decreasing of the rate of flow in said first line being accomplished by variably throttling the flow in said first line, the pressure in the first line being continuously measured upstream of the location at which the variable throttling is effected, passing a portion of said liquid from said source to an underground surge zone via a second line when the measured pressure in said first line reaches a predetermined value, said cavern comprising a cavity formed within an underground impermeable formation and having an access bore communicating with the ground surface, the lower portion of said cavity being normally occupied by a pool of liquid displacing medium heavier than and immiscible with said liquid, said liquid displacing said displacing medium from sad cavern when said liquid is introduced therein, and passing said liqud from said cavern to said feed supply line when the increased flow rate within said first line is insufficient to maintain the flow rate in said feed supply line within said desired flow rate range.

2. The process according to claim 1 wherein said liquid is natural gasoline, and said displacing medium is brine.

3. The process according to claim 1 wherein said liquid is passed into said cavern in the form of a plurality of streams so as to increase the uniformity of composition of said liquid.

4. The process according to claim 1 wherein the location of the interface formed between said liquid and said liquid displacing medium is continuously measured and the desired flow rate range in said feed supply line is automatically reset in accordance with said interface so as to prevent the complete filling and emptying of said liquid in said cavern.

5. A surge system comprising, in combination; a first conduit connected to a source of liquid having a normally variable rate of flow; a second conduit connected to said first conduit; a feed supply conduit connected to said second conduit; a third conduit connected to said first conduit; an underground surge cavern connected to said third conduit; a fourth conduit connected to said feed supply conduit at one end and to said cavern at the other end; a flow control means including flow sensing means operatively connected to said feed supply conduit; pressure control means including pressure sensing means operatively connected to said second conduit; first and second flow control valve means in said second and fourth conduits, respectively, and operatively connected to and controlled by said flow control means, said first flow control valve means being located in the second conduit downstream of the connection between said pressure control means and the second conduit; third flow control valve means in said third conduit, and operatively connected and controlled by said pressure control means; said first control valve means being responsive to said flow control means in such a manner that when flow in the feed supply conduit increases the first control valve moves toward closed position, and when the flow in the feed supply conduit decreases the first control valve moves towards opened position; said second control valve means being responsive to said flow control means in such a manner that when the flow in the feed supply conduit decreases below a predetermined minimum said second control valve means moves from closed to opened position; and said third control valve means being responsive to said pressure control means in such a manner that when the pressure in the second conduit upstream of the first control valve means increases above a predetermined maximum the third control valve means moves from closed to opened position.

6. The surge system according to claim 5 wherein said cavern is formed within an underground impermeable formation having an access bore communicating with ground surface with a pool of liquid displacing medium heavier than and immiscible with said liquid occupying the lower portion of said cavern.

7. The surge system according to claim 6, wherein said access bore is provided with a casing and spaced first and second tubing depending therein, the lower ends of said tubings normally depending below the interface formed between said liquid and liquid displacing medium, the upper end of said first tubing being connected to said third conduit and the upper end of said casing being connected to said fourth conduit, and wherein storage means located above ground are connected to the upper end of said second tubing.

8. The surge system according to claim 7 wherein the lower portion of said first tubing is provided with a plurality of openings which progressively increase in size toward the lower end of said first tubing.

9. The surge system according to claim 7 wherein liquid level control means are disposed in said cavern and are operatively connected to said flow rate control means so as to reset the latter when necessary to maintain said interface at a desired depth.

10. The surge system according to claim 6, wherein said cavern is provided with a plurality of input wells communicating with the lower portion of said cavern adjacent the periphery thereof, said wells being operatively conected to said third conduit, said access bore being provided with a casing and a tubing depending therein, the upper end of said casing being connected to said fourth conduit, and the upper end of said tubing being connected to above ground storage means with the lower end of said tubing normally depending below the interface formed between said liquid and said liquid displacing medium.

References Cited in the file of this patent
UNITED STATES PATENTS

| | | |
|---|---|---|
| 652,375 | Snell | June 26, 1900 |
| 916,130 | Evans | Mar. 23, 1909 |
| 1,371,242 | Hopwood | Mar. 15, 1921 |
| 2,317,800 | Peter et al. | Apr. 27, 1943 |
| 2,879,646 | Brandt | Mar. 31, 1959 |
| 2,910,079 | Beeghley | Oct. 27, 1959 |
| 2,922,281 | Brooks | Jan. 26, 1960 |